United States Patent
Carr

[11] 3,937,977
[45] Feb. 10, 1976

[54] COMBINATION DISPOSER RUN AND DISHWASHER DISCONNECT SWITCH FOR KITCHEN MODULE

[75] Inventor: Keith Ellis Carr, Stevensville, Mich.

[73] Assignee: Whirlpool Corporation, Benton Harbor, Mich.

[22] Filed: Aug. 26, 1974

[21] Appl. No.: 500,599

[52] U.S. Cl.............................. 307/38; 134/115 G
[51] Int. Cl.² ............................................ H02J 4/00
[58] Field of Search .... 241/257 G, 46 A, 36, 100.5; 307/11, 38, 39, 41, 30, 35, 112, 113, 114, 115; 134/57 D, 58 D, 115 G, 57 DL, 58 DL; 318/102; 200/61.62

[56] References Cited
UNITED STATES PATENTS

| | | | |
|---|---|---|---|
| 2,813,534 | 11/1957 | Low............................ | 241/100.5 X |
| 3,119,046 | 1/1964 | Usher............................ | 307/114 X |
| 3,538,341 | 11/1970 | Pankow ............................ | 307/38 |
| 3,695,519 | 10/1972 | Behinger...................... | 241/257 GX |

*Primary Examiner*—James R. Scott
*Assistant Examiner*—M. Ginsburg
*Attorney, Agent, or Firm*—Hill, Gross, Simpson, Van Santen, Steadman, Chiara & Simpson

[57] ABSTRACT

An electrical switch in a modular unit between a single fused 15 amp power source and two electrical appliances, such as a garbage disposer and a dishwasher in a kitchen unit, is connected so that only one appliance can be connected to the power source at any one time.

1 Claim, 3 Drawing Figures

COMBINATION DISPOSER RUN AND DISHWASHER DISCONNECT SWITCH FOR KITCHEN MODULE

BACKGROUND OF THE INVENTION

1. Field of the Invention

This invention relates to an improvement in electrical circuitry employed to connect different appliances in a modular unit to a single fused source of power.

2. Description of the Prior Art

In the prior art, a modular unit having for instance a sink, a food waste disposer, and a dishwasher has required two 120 V., 15 ampere fused supply circuits because of the current requirements of each of the food waste disposer and the dishwasher. The requirement of dual circuitry for the two appliances caused relatively high material and installation costs.

SUMMARY OF THE INVENTION

In accordance with this invention, a double-throw electrical switch is used in place of the single throw switch commonly used to control the availability of power to one appliance such as a garbage disposer. The second contact or pair of contacts in the double throw switch, normally closed vis-a-vis the first appliance, is connected to the second appliance. The second appliance may have a separate start/stop switch, so that power is normally provided to the second appliance via the double throw switch in the first appliance except when the first appliance is running. With this arrangement, the first and the second appliances share the same power source, but are never operated at the same time and thus the power source can not be overloaded.

DESCRIPTION OF THE PREFERRED EMBODIMENTS

Figure 1:
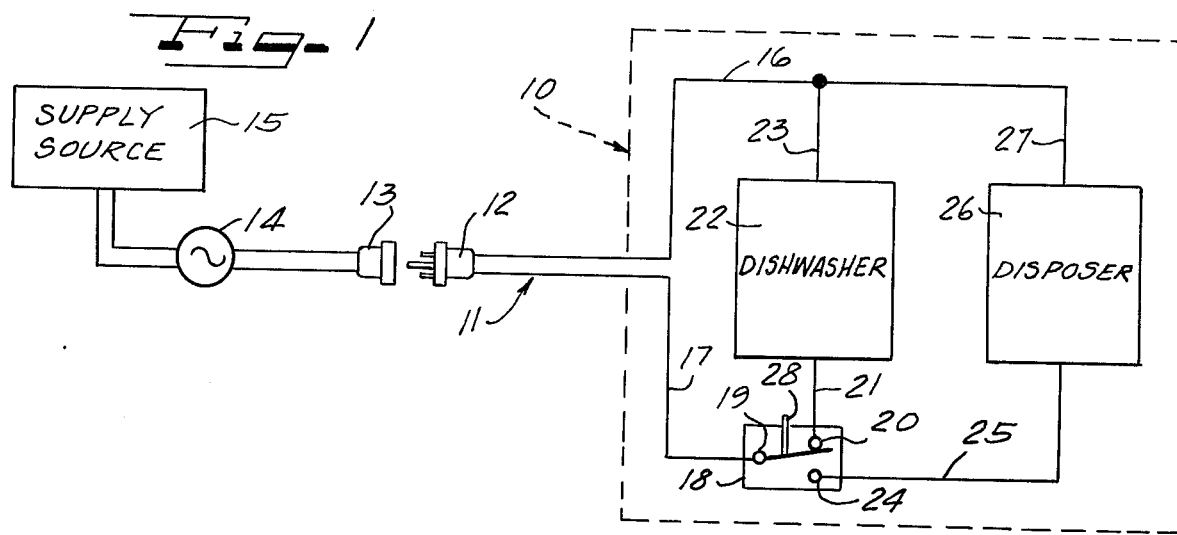
FIG. 1 is a schematic view of the circuitry of the invention using a single pole switch.

Referring to the schematic of FIG. 1, a modular kitchen unit 10 has a power cord 11 ending in a plug 12 which may be inserted into a conventional a.c. 110–120 volt wall outlet 13. The wall outlet 13 is supplied with power through an overload protective device 14 from an electrical power source such as the usual domestic supply in the house shown generally at 15. While it is contemplated that the device 14 may conveniently comprise a fuse it will be appreciated that a circuit breaker or any other form of protective device may be employed. The power cord 11 on the module 10 has two conductors 16 and 17. A conductor 17 connects with a switch 18 and a pole 19 therein. A movable contact within the switch 18 normally connects the pole 19 with a first contact 20. A further conductor 21 connects the contact 20 to a first appliance 22 such as a dishwasher to supply electrical energy to the motor and other functional and control circuits thereof. A final conductor 23 connects the appliance 22 with the other wire 16 of the power cord 11.

A second contact 24 in the double-throw switch 18 may be connected to the pole 19 upon operation of the switch when it is desired to operate the second appliance. A conductor 25 connects the second contact 24 to a second appliance 26 such as a garbage disposer to supply electrical energy to the motor or other functional and control circuits thereof. A further wire 27 completes the circuit to conductor 16 of the power cord 11 as previously.

Figure 3:
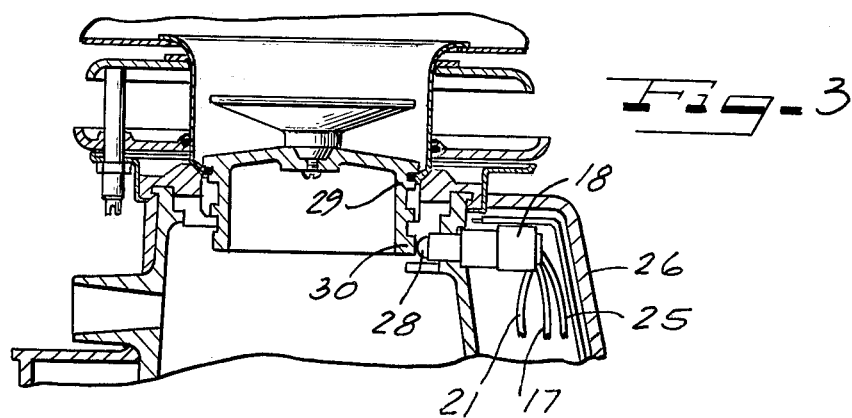
FIG. 3 is a partial view in cross section of a batchfeed garbage disposer employing a cam operated switch with the circuitry of the invention.

FIG. 3 shows the upper portion of a batchfeed garbage disposer corresponding to the second electrical appliance 26 of FIG. 1 and incorporating the circuitry thereof. The line switch 18 is shown operated by a plunger 28 which is cammed by the stopper assembly 29 of the disposer unit. The conductor wire 17 leads to the pole of the switch 18, while the conductor 21 leads from the normally closed contact 20 of the switch 18 to the other electrical appliance in the kitchen module and conductor 25 leads from the normally open contact 24 in the switch 18 to one side of the motor circuit of the garbage disposer 26. When the switch plunger 28 is operated by a cam 30 on the rotatable stopper assembly 29, the contact 20 is disconnected from the pole 19 and the contact 24 is connected thereto as previously described.

Figure 2:
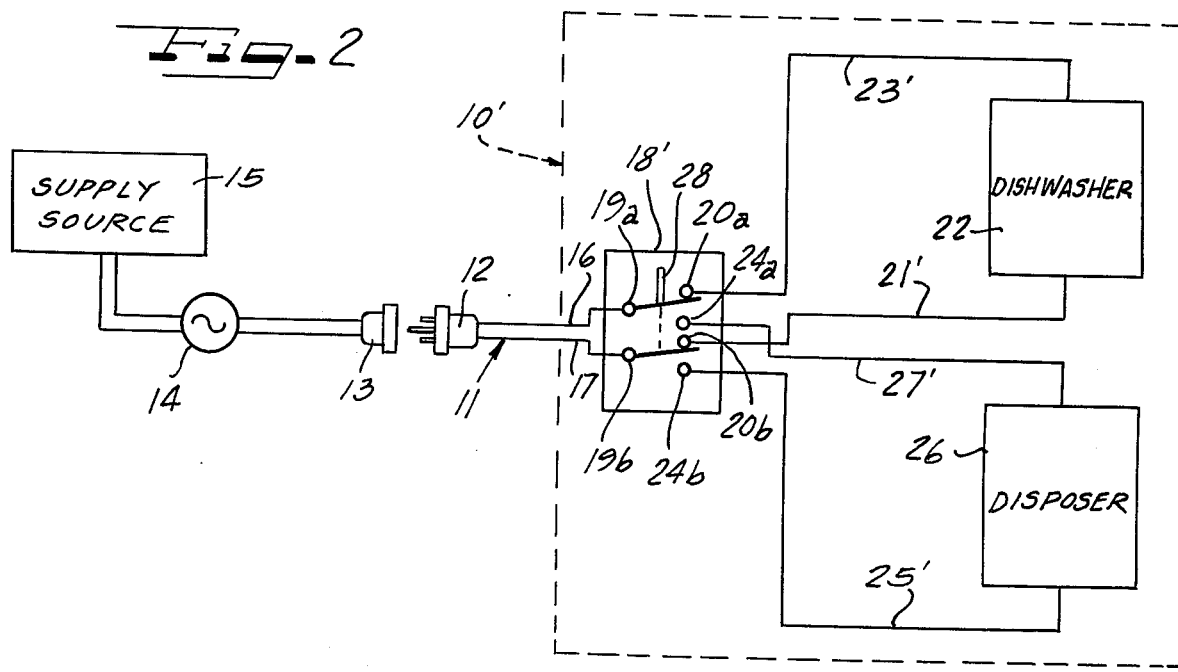
FIG. 2 is a schematic diagram of an alternative embodiment of the circuitry of the invention, employing a double-pole switch.

The invention of the present disclosure may also be employed in the alternative embodiment shown in FIG. 2 where a double-pole, double-throw switch is used to connect both conductors of the power cord 11 to one or the other of the electrical appliances. In describing this form of the invention like reference numerals will be used where possible with the addition of a prime mark if needed to develop any differences in identification. In this form of the invention, a double-pole, double-throw switch 18' has a first pole 19a connected to one conductor 16 of the power cord 11 and a second pole 19b connected to the second conductor 17 of said power cord. The switch 18' has two normally closed contacts 20a and 20b which connect respectively to the poles 19a and 19b. The contacts 20a and 20b are connected to the first electrical appliance 22 via conductors 21' and 23' as shown.

The other set of contacts 24a and 24b in the switch 18', which are normally open, are connected via conductors 27' and 25' to the second electrical appliance 26 in the manner previously described. When the switch plunger 28 is actuated, the poles 19a and 19b are disconnected from the contacts 20a and 20b to the first appliance 22 and are connected instead to contacts 24a and 24b to energize the second electrical appliance 26.

The double-pole, double-throw switch 18' may be employed in the same manner as the single pole, double throw switch 18 shown in FIG. 3, but there would be six wires leading to the switch rather than three as shown in FIG. 3.

Switches 18 or 18' may also be employed in connection with electrical appliances other than batchfeed garbage disposers by mounting same in a wall adjacent the module unit or on another place on the module. Such other arrangements would be particularly suitable for continuous feed garbage disposers or the like.

Although various modifications might be suggested by those versed in the art, it should be understood that I wish to embody within the scope of the patent warranted hereon all such modifications as reasonably and properly come within the scope of my contribution to the art.

Having described the invention, the embodiments of the invention in which an exclusive property or privilege is claimed are defined as follows:

1. A modular kitchen unit comprising a dishwasher, a sink, and a batch-feed garbage disposer in said sink, in combination with, a supply circuit having a single overload protection means remote from said unit, and comprising: an electrical switch in said disposer, means electrically connecting said switch to said single overload protection means and to circuitry for operating said unit, said switch having a first, normally closed contact means therein to supply electrical energy to said dishwasher and having a second, normally open contact means therein to supply electrical energy upon actuation of said switch to said disposer, said actuation interrupting said supply of energy to said dishwasher and connecting power to said disposer so that said single overload protection means is used and only one appliance is connected to the power source at one time.

* * * * *